United States Patent [19]

Kraft et al.

[11] Patent Number: 4,624,154
[45] Date of Patent: Nov. 25, 1986

[54] DRIVE UNIT FOR MOTOR VEHICLE

[75] Inventors: Karl-Friedrich Kraft, Esslingen; Hans Merkle, Stuttgart, both of Fed. Rep. of Germany

[73] Assignee: Daimler-Benz Aktiengesellschaft, Fed. Rep. of Germany

[21] Appl. No.: 563,640

[22] Filed: Dec. 20, 1983

[30] Foreign Application Priority Data

Dec. 28, 1982 [DE] Fed. Rep. of Germany ....... 3248350

[51] Int. Cl.$^4$ .................. F16H 37/08; F16H 37/06
[52] U.S. Cl. .......................................... 74/695; 74/682; 74/705
[58] Field of Search ............ 74/682, 695, 705, 720.5, 74/758, 760

[56] References Cited

U.S. PATENT DOCUMENTS

| | | | |
|---|---|---|---|
| 4,056,988 | 11/1977 | Kubo et al. | 74/695 |
| 4,342,238 | 8/1982 | Gardner | 74/705 X |
| 4,449,423 | 5/1984 | Carriere | 74/705 X |
| 4,452,099 | 6/1984 | Croswhite | 74/695 |

FOREIGN PATENT DOCUMENTS

| | | | |
|---|---|---|---|
| 0038538 | 10/1981 | European Pat. Off. | |
| 0075271 | 3/1983 | European Pat. Off. | |
| 0080882 | 6/1983 | European Pat. Off. | |
| 1153267 | 2/1964 | Fed. Rep. of Germany | |
| 1650840 | 9/1970 | Fed. Rep. of Germany | |
| 3226647 | 3/1983 | Fed. Rep. of Germany | |
| 2497736 | 7/1982 | France | |
| 56-39346 | 4/1981 | Japan | |
| 0150643 | 11/1981 | Japan | 74/695 |
| 0173641 | 10/1982 | Japan | 74/695 |
| 0190152 | 11/1982 | Japan | 74/695 |
| 894222 | 4/1962 | United Kingdom | |
| 1100334 | 1/1968 | United Kingdom | |
| 1157049 | 7/1969 | United Kingdom | |
| 1179478 | 1/1970 | United Kingdom | |
| 1406686 | 1/1977 | United Kingdom | |
| 1575381 | 9/1980 | United Kingdom | |
| 2104984 | 3/1983 | United Kingdom | |

Primary Examiner—Kenneth J. Dorner
Assistant Examiner—Dirk Wright
Attorney, Agent, or Firm—Barnes & Thornburg

[57] ABSTRACT

In a drive unit for motor vehicles, the axes of rotation of the main shaft of an engine and an input wheel of an intermediate transmission are arranged in line with one another in relation to one of two parallel geometrical main axes, and the axes of rotation of an output shaft, couplable to a differential, of a gear-change transmission of epicyclic design, of a transmission member connected fixedly in terms of rotation to the output shaft and belonging to an epicyclic transmission and of the output wheel of the intermediate transmission are arranged in line with one another in relation to the other main axis. The input shaft of the gear-change transmission can be driven from the main shaft. The output wheel can be brought into drive-connection with another transmission member of the epicyclic transmission which has the transmission member connected fixedly in terms of rotation to the output shaft. To allow a gear-change transmission with more than four forward gears to be accomodated, the axes of rotation of the input shaft of a drive clutch and of a transmission member, couplable to the input shaft by means of the drive clutch and belonging to an epicyclic transmission, which has a transmission member which can be brought into drive-connection with the input wheel, are arranged in line with one another relative to the main axis of the main shaft.

37 Claims, 6 Drawing Figures

| Gang | 21 | 31 | 40 | 35 | 37 | 47 | 44 | 38 | F2 |
|------|----|----|----|----|----|----|----|----|----|
| I    | X  |    |    |    | X  | X  |    | (X)|    |
| II   | X  |    |    | X  |    | X  |    |    |    |
| III  | X  | X  |    |    |    | X  |    |    |    |
| IV   | X  | X  |    |    |    |    | X  |    | (X)|
| V    | X  | X  | X  |    |    |    |    |    |    |
| R    |    | X  |    |    | X  | X  |    |    |    |

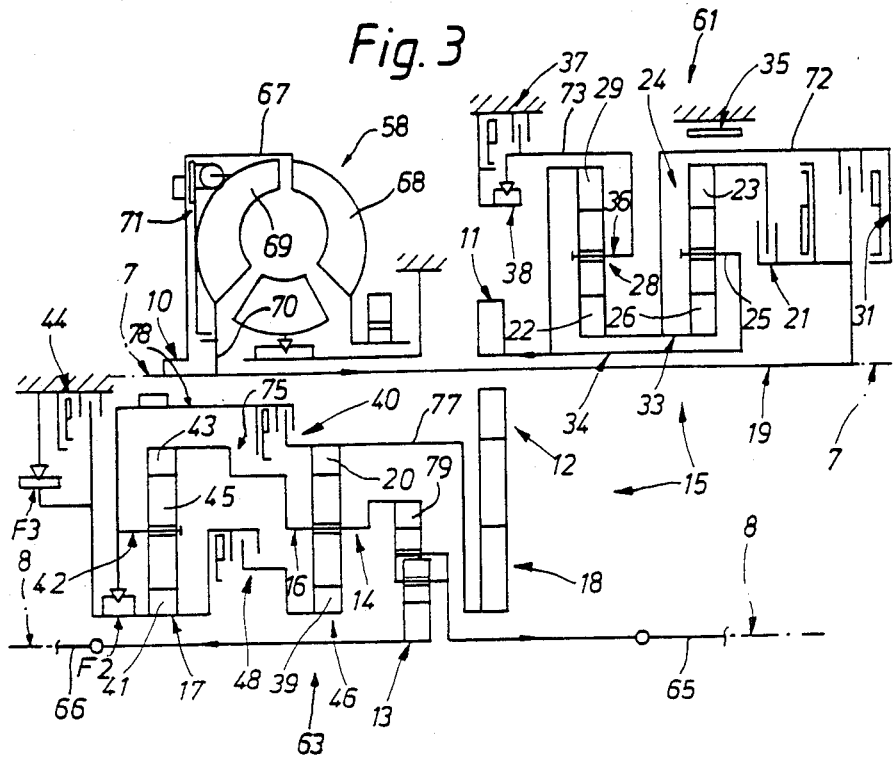

| Gang | 21 | 40 | 31 | 35 | 44 | 37 | 57 | 53 |
|------|----|----|----|----|----|----|----|-----|
| I    | X  | X  |    |    | X  |    |    | (X) |
| II   | X  |    |    | X  | X  |    |    |     |
| III  | X  |    | X  |    | X  |    |    |     |
| IV   | X  | X  | X  |    |    |    | (X)|     |
| V    |    | X  | X  | X  |    |    |    |     |
| R    | X  | X  |    |    |    | X  |    |     |

DRIVE UNIT FOR MOTOR VEHICLE

BACKGROUND OF THE INVENTION

The invention relates to drive units for vehicles. Preferred embodiments of the invention are especially suitable for cases of installation in which a specific axle offset is to be overcome in the course of the power transmission from the engine to the wheels. When the two part transmissions are connected advantageously and when the total transmission ratio is allocated in a suitable way according to the present invention, better transmission efficiencies are achieved in comparison with normal drives.

A practical example can be an automobile design with a transverse engine and front-wheel drive. To ensure an economical engine drive, it is necessary for the transmission to have 5 forward gears and for the power transmission from the engine to the wheels to have as few losses as possible. However, the space available as an extension of the engine crankshaft is often not sufficient to install a five-speed transmission of standard design in the vehicle.

The invention is especially concerned with drive units for motor vehicles of the type in which the axes of rotation of the main shaft of an engine and of an input wheel of an intermediate transmission are arranged in line with one another in relation to one of two parallel geometrical main axes, and in which the axes of rotation of an output shaft, connectable to a differential, of a first pick-off member gear-change transmission of epicyclic design, of a transmission member connected fixedly in terms of rotation to the output shaft and belonging to a first epicyclic transmission and of the output wheel of the intermediate transmission are arranged in line with one another in relation to the other main axis, the input shaft of the gear-change transmission can be driven from the main shaft, and the output wheel can be brought into drive-connection with an outer central wheel transmission member of the epicyclic transmission which has the transmission member connected fixedly in terms of rotation to the output shaft.

In a known drive unit of this type (German Offenlegungsschrift No. 1,650,840, FIG. 1), a Ravigneaux transmission is used for the gear-change transmission. This transmission has two inner central wheels and an outer central wheel, two gear clutches and two gear brakes, is assigned completely to the main axis of the output wheel of the intermediate transmission and provides three forward gears and one reverse gear. The axis of rotation of the differential coincides with a third geometrical main axis lying parallel to the other two main axes. It is also known from this publication to provide, instead of one gear clutch, a second intermediate transmission which, however, ensures only a constant drive connection between a hydrodynamic torque converter, driven by the engine, and one inner central wheel, whilst the other intermediate transmission is driven directly by the main shaft and is connected to the remaining gear clutch of the other inner central wheel. The number of forward gears is, however, not increased as a result of this second intermediate transmission.

In a further known drive unit of this general type (German Auslegeschrift No. 1,625,125), a Ravigneaux transmission or the like, formed from two twin-coupled single-web epicyclic transmissions and having four free transmission members, is used to achieve four forward gears by means of power branching via a second intermediate transmission, one free transmission member being couplable to the output wheel via a drive clutch located at one transmission end and via one intermediate transmission, two other free transmission members being couplable independently of one another to the turbine wheel of a hydrodynamic torque converter via two drive clutches located at the other transmission end and via the other intermediate transmission, and the fourth free transmission member being connected to the output shaft. However, the gear-change transmission, together with the drive clutches and the gear brakes, is assigned completely to the main axis, parallel to the main axis of the main shaft, of the output wheels of the two intermediate transmissions.

It is known from U.S. Pat. No. 3,482,469, in another drive unit of this general type, in order to achieve six to eight forward gears, to connect the output shaft to one transmission member of a single-web epicyclic transmission or of a Ravigneaux transmission, to connect another transmission member of this transmission to a further Ravigneaux or Simpson transmission and to connect two drive shafts extending from a hydrodynamic torque converter, each by means of an intermediate transmission located at a particular end of the gear-change transmission assigned as a whole to the main axis parallel to the main axis of the main shaft, to the two epicyclic transmissions via an appropriate number of drive clutches, in such a way that these epicyclic transmissions interact in series or individually with the torque converter.

An object of the invention is primarily to achieve a compact design, which is short in the directions of the main axes, in a drive unit of the above-mentioned general type. According to preferred embodiments, such compact design includes a hydrodynamic torque converter which is arranged in the flux of force in series between an engine and a gear-change transmission having at least five forward gears and which preferably operates with a bridging clutch.

The above-mentioned objects are achieved according to preferred embodiments of the invention by providing a drive unit wherein the axes of rotation of the input shaft of a drive clutch and of a transmission member couplable to the input shaft by means of the drive clutch and belonging to an epicyclic transmission which has a transmission member which can be brought into drive-connection with the input wheel, are arranged in line with one another relative to the main axis of the main shaft.

Further objects, features, and advantages of the present invention will become more apparent from the following description when taken with the accompanying drawings which show, for purposes of illustration only, several embodiments in accordance with the present invention.

BRIEF DESCRIPTION OF THE DRAWINGS

FIG. 3 is a schematic transmission diagram illustrating a drive unit constructed according to a second preferred embodiment of the invention;

FIG. 4 is a gear-shift diagram for the shifting means effective in the individual gears, in the gear-change transmission of FIG. 3;

DETAILED DESCRIPTION OF THE DRAWINGS

Figures 1, 2:
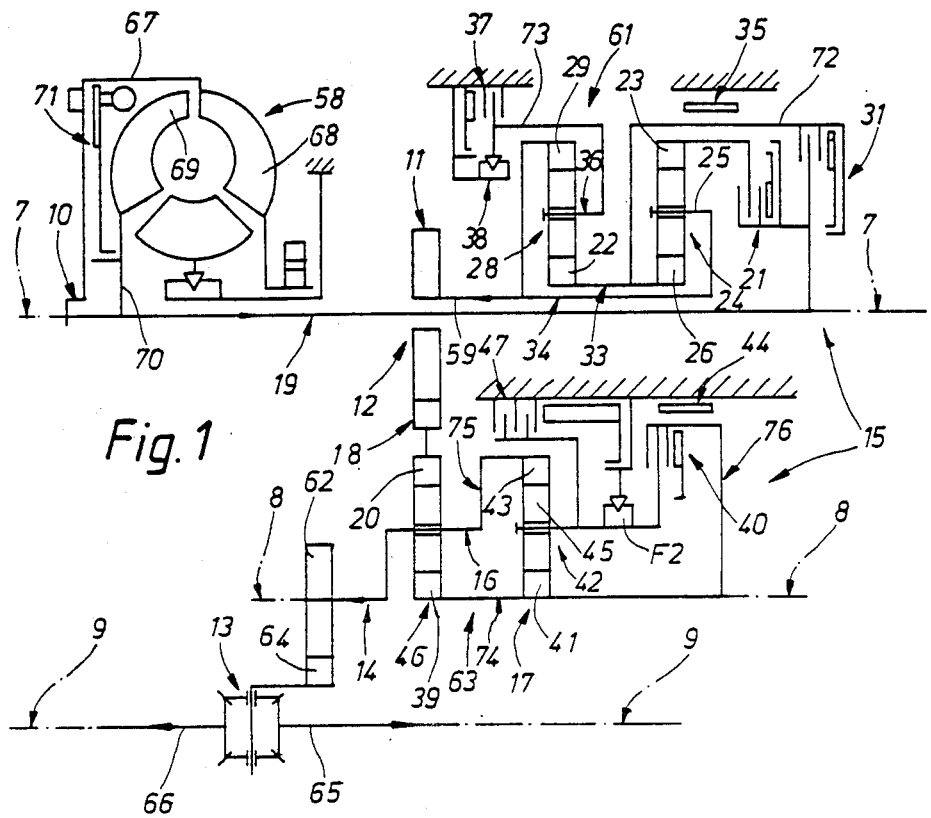
FIG. 1 is a schematic transmission diagram illustrating a drive unit constructed according to a first preferred embodiment of the present invention.
FIG. 2 is a gear-shift diagram for the shifting means effective in the individual gears, in the gear-change transmission of FIG. 1.

With reference to FIGS. 1 and 2, three parallel geometrical main axes 7—7, 8—8 and 9—9 are characteristic of the first embodiment. The axes of rotation of a main shaft 10 of an engine, of a hydrodynamic torque converter 58, of the input wheel 11 of an intermediate transmission 12, of an input shaft 19 and of a Simpson transmission 61 are in line or coincide with the main axis 7—7.

The axes of rotation of a spur-wheel drive pinion 62, of an output shaft 14 connected fixedly in terms of rotation to the drive pinion 62, of an output wheel 18 of the intermediate transmission 12 and of a second Simpson transmission 63 inserted in the force drive train between the output shaft 14 and the output wheel 18 are in line or coincide with the second main axis 8—8.

The axes of rotation of a driving gear ring 64 meshing with the drive pinion 62, a differential 13 driven by the gear ring 64 and the halfshafts 65 and 66, which extend from the differential 13 and each of which drives a vehicle wheel, are in line or coincide with the third main axis 9—9.

The torque converter 58 has an outer housing shell 67 which receives a turbine wheel 69 and a bridging clutch 71 and which connects a pump impeller 68 fixedly in terms of rotation to the main shaft 10. The turbine wheel 69, couplable to the main shaft 10 by means of the bridging clutch 71, is connected fixedly in terms of rotation by means of its hub 70 to the input shaft 19 which is connected at its opposite end to two drive clutches 21 and 31 of the Simpson transmission 61. The Simpson transmission 61 comprised in a conventional way of two epicyclic or planetary gear transmissions 24 and 28 twin-coupled to one another by means of two coupling shafts 33 and 34. The outer coupling shaft 33 designed as a hollow shaft connects the inner central wheels 22 and 26, whilst the inner coupling shaft 34, which is likewise designed as a hollow shaft and through which passes the input shaft 19, connects the pick-off member 25 of the rear epicyclic transmission 24 to the outer central wheel 29 of the front epicyclic transmission 28. The outer central wheel 23 of the rear epicyclic transmission 24 is connected to one drive clutch 21 and the outer coupling shaft 33 is connected via a drive drum 72 both to the other drive clutch 31 and to a gear brake 35. The free pick-off member 36 of the front epicyclic transmission 28 is connected by means of a drive drum 73 both to a gear brake 37 and to a parallel free-wheeling brake 38.

The intermediate transmission 12 is designed as a gear-wheel stage, and the annular gear wheel which is used as the input wheel 11 and through which passes the input shaft 19 is connected to the inner coupling shaft 34 by means of a hollow shaft 59.

The Simpson transmission 63 of the other main axis 8—8 comprises, in turn, two epicyclic or planetary gear transmissions 17 and 46 which are twin-coupled to one another by means of two coupling shafts 74 and 75. The inner central wheels 39 and 41 are connected to the coupling shaft 74 and the outer central wheel 43 of the rear epicyclic transmission 17, the pick-off member 16 of the front epicyclic transmission 46 and the output shaft 14 being connected to the other coupling shaft 75. The free outer central wheel 20 is arranged concentrically and fixedly in terms of rotation relative to the annular gear wheel functioning as an output wheel 18 and belonging to the gear-wheel stage.

A drive drum 76, connected fixedly in terms of rotation to the coupling shaft 74, is connected both to a gear clutch 40, itself connected to the free pick-off member 42, and to a gear brake 44. The free pick-off member 42 supporting the planet wheels 45, which mesh with the two central wheels 41 and 43, is also connected separately to a gear brake 47 with which a freewheeling brake $F_2$ is connected in parallel.

Thus, the gear-change transmission 15 is allocated in spatial terms to the two main axes 7—7 and 8—8, and a compact and short design is achieved as a result. At the same time, it is also within the scope of the invention to assign to the main axis 7—7 merely one single web epicyclic transmission, or even more than two single-web epicyclic transmissions, if appropriate in a design with multiple coupling according to other preferred embodiments.

It emerges from the gear-shift diagram of FIG. 2 that in first gear the two Simpson transmissions 61 and 63 are shifted into the higher of the two transmission ratios as a result of the braking of their respective free pick-off members 36 and 42, since the coupling shaft 33 or 74 functioning as a reaction member is forced to rotate in an opposite direction to the input shaft 19. The gear ratio is therefore formed by multiplication of the two higher transmission ratios.

In contrast to this, in second gear, the coupling shaft 33 functioning as a reaction member and belonging to the Simpson transmission 61 is braked, so that in the latter the lower ratio is selected and the gear ratio is formed by multiplication from the lower transmission ratio of the Simpson transmission 61 and from the higher transmission ratio of the Simpson transmission 63.

In third gear, the Simpson transmission 61 is shifted into the direct transmission ratio, and only the higher transmission ratio of the Simpson transmission 63 is used for the gear ratio.

In fourth gear, however, the coupling shaft 74 functioning as a reaction member is braked, so that the gear ratio results soley from the now effective lower transmission ratio of the Simpson transmission 63.

Finally, in fifth gear, the Simpson transmission 63 is also braked into the direct transmission ratio and a gear ratio of 1:1 is obtained as a result.

In reverse gear, the epicyclic transmission 28 functions as a reversing transmission, because its pick-off member 36 is braked and its central wheel 22 not connected to the transmission output (input wheel 11) is connected to the input shaft 19. As a result, the input wheel 11 is driven in the direction opposite to the input shaft 19. In the Simpson transmission 63, the higher transmission ratio is selected by means of the gear brake 47, so that the gear ratio is formed from the transmission ratio of the reversing transmission 28 and from the transmission ratio of the Simpson transmission 63.

In the second embodiment of FIG. 3, similar reference characters as in the FIG. 1 embodiment are used to identify similar parts. Reference is also made to the foregoing description of these parts. This second embodiment of FIGS. 3 and 4 differs from the first embodiment of FIG. 1 in that, to design the fifth gear as an overdrive gear, the inner central wheels 39 and 41 of the gear change or Simpson transmission 63 of the main axis 8—8 are connected to one another by means of an isolating clutch 48, which is opened in fifth gear only, but which is engaged in the remaining gears and then performs the function of a shaft, for example, in a similar way to the coupling shaft 74 of the first embodiment, and the fourth gear has the ratio 1:1.

Further, in the second embodiment of FIGS. 3 and 4, the axes of rotation of the differential 13, functioning exclusively with spur wheels, and of the hollow drive shafts 65 and 66 coincide with the main axis 8—8.

In the gear-change transmission 15 of FIG. 3 also, a Simpson transmission 61, an input wheel 11 of an intermediate transmission 12, a torque converter 58 and a main shaft 10 are assigned in an identical design and in the same way as in FIG. 1 to a main axis 7—7, and the same reference numerals are therefore used in FIG. 3 for the equivalent features. To avoid unnecessary repetition, reference can therefore be made to the description in FIG. 1 for an explanation of the design and function of the unit and transmission parts assigned to the main axis 7—7.

The output wheel 18 is connected, via a drive drum 77 engaging over the differential 13, to the outer central wheel 20 of the epicyclic transmission 46 which is adjacent to the differential 13 and which is itself connected to the other epicyclic transmission 17 by means of the coupling shaft 75 which is connected via the output shaft 14 to the outer central wheel 79 of the differential 13. A drive drum 78 engaging over the epicyclic transmission 17 is connected on the one hand to the outer central wheel 20 by means of the gear clutch 40 and on the other hand to the pick-off member 42 supporting the planet wheels 45 and belonging to the epicyclic transmission 17. The coupling shaft 75 in turn connects the outer central wheel 43 meshing with the planet wheels 45 to the pick-off member 16 of the epicyclic transmission 46. The inner central wheels 39 and 41 can again be braked via a gear brake 44.

As the gear-shift diagram of FIG. 4 demonstrates, in first gear the Simpson transmission 61 is shifted into the higher ratio as a result of the braking of its free pick-off member 36 and the transmission 63 is shifted into a lower ratio which it also maintains in second gear and in third gear, with the result that the gear ratio is obtained by multiplication from the higher ratio of the Simpson transmission 61 and from the lower ratio of the transmission 63 formed only in the epicyclic transmission 46.

In second gear, the Simpson transmission 61 is shifted into its lower ratio because the coupling shaft 33 is braked, so that the gear ratio is obtained from the product of the two lower transmission ratios.

In third gear up to fifth gear, the Simpson transmission 61 is shifted into its direct transmission ratio, with the result that the gear ratio in third gear is formed solely from the transmission ratio of the epicyclic transmission 46.

In fourth gear, the transmission 63 is also shifted into its direct ratio, with the result that the gear ratio is 1:1.

In fifth gear, the pick-off member 42 is driven directly by the output wheel 18 and as a result the coupling shaft 75 is driven at a higher speed, so that the gear ratio is formed only from the transmission ratio of the epicyclic transmission 17.

In reverse gear, the epicyclic transmission 28 again functions as a reversing transmission, as in the first embodiment, because its pick-off member 36 is braked and its two central wheels 22 and 29 are connected respectively to the transmission input (input shaft 19) and to the transmission output (input wheel 11). As a result, the gear ratio is formed by multiplication from the negative transmission ratio of the reversing transmission 28 and from the transmission ratio of the epicyclic transmission 46.

In the third embodiment of FIG. 5, again similar reference characters as in FIGS. 1 and 3 embodiments are used to identify similar parts. Reference is also made to the foregoing descriptions of these parts. Also in the third embodiment of FIGS. 5 and 6 a gear-change transmission 15 is allocated in spatial terms to two parallel main axes 7—7 and 8—8, so that a coupling transmission 80, which is composed of two epicyclic transmissions 24 and 28 twin-coupled to one another by means of two coupling shafts 33 and 34, is assigned to the main axis 7—7 and a transmission 81 with two epicyclic transmissions 17 and 46 is also assigned to the main axis 8—8.

The axes of rotation of a main shaft 10 of an engine, an input shaft 19, a hydrodynamic torque converter 58 identical in design and function to the torque converter 5 of the first two embodiments, a first input wheel 11 of an intermediate transmission 12, a second input wheel 50 of a second intermediate transmission 49 and the coupling transmission 80 are in line or coincide with the main axis 7—7.

The axes of rotation of a differential 13, the associated halfshafts 65 and 66, a reduction unit 54, an output shaft 14 of the epicyclic transmission 17 and 46, the output wheel 18 of the first intermediate transmission 12 and an output wheel 51 of the second intermediate transmission 49 are in line or coincide with the other main axis 8—8. The intermediate transmissions 12 and 49 are designed as spur-wheel transmissions and each have an intermediate gear wheel 83, 84 which is mounted rotatably on an intermediate shaft 82 arranged immovably in the housing relative to the space axes and which meshes with the input wheel 11 and 50 and the output wheel 18 and 51 respectively and thus prevents a reversal of the direction of rotation.

With reference to the coupling transmission 80 of the main axis 7—7, the input shaft 19 is connected at one end to a drive drum 85 which is itself connected to the coupling shaft 34 by means of a drive clutch 21 and to one free pick-off member 32 by means of a drive clutch 31. The other free pick-off member 25 is connected via a drive drum 60 both to a gear brake 37 and to the first input wheel 11. The coupling shaft 33 connects an inner central wheel 26 to an outer central wheel 27. The coupling shaft 34 connects the other inner central wheel 30 to the other outer central wheel 23.

The coupling shaft 33 is connected on the one hand to a gear brake 35 and on the other hand by means of an overrunning clutch 57 to the other coupling shaft 34 which is connected to the second input wheel 50 via a hollow shaft 59.

With reference to the transmission 81 of the other main axis 8—8, the output wheel 18 is connected by means of a coupling shaft 75 both to the outer central wheel 43 of one epicyclic transmission 17 and to the pick-off member 16 of the other epicyclic transmission 46. The second output wheel 51 is connected to the inner central wheel 39 of the adjacent epicyclic transmission 46, the outer central wheel 20 of which is connected to the inner central wheel 41 of the other epicyclic transmission 17 by means of a drive connection 52 containing a gear clutch 40. An overrunning clutch 53 is connected in parallel with the gear clutch 40. The inner central wheel 41 is also connected to the gear brake 44 and the output shaft 14 is connected to the pick-off member 42 of the epicyclic transmission 17. On the other hand, the output shaft 14 is connected to the inner central wheel 86 of the reduction unit 54, the pick-off member 87 of which is connected to the differential 13 and the outer central wheel 56 of which is fixed on a non-rotating housing part 55.

Figures 5, 6:
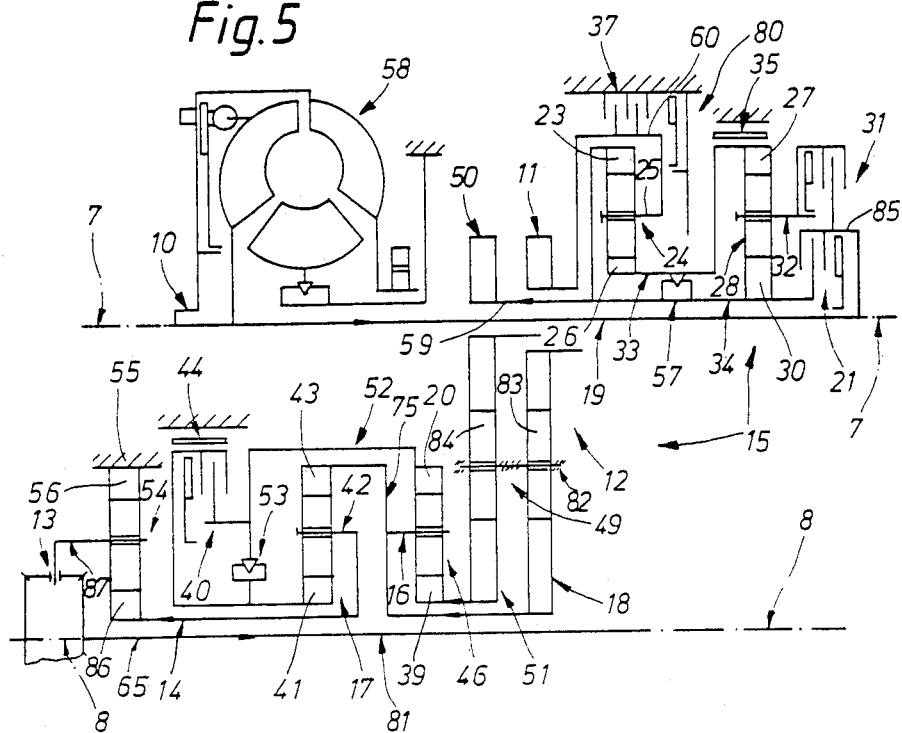
FIG. 5 is a schematic transmission diagram illustrating a drive unit constructed according to a third preferred embodiment of the invention.
FIG. 6 is a gear-shift diagram for the shifting means effective in the individual gears, in the gear-change transmission of FIG. 5.

With reference to the gear-shift diagram of FIG. 6, in first gear the coupling transmission 80 does not participate in forming the gear ratio, but the second input wheel 50 is connected directly to the input shaft 19 by means of the drive clutch 21.

Since the drive connection 52 is braked by means of the central wheels 20 and 41, the gear ratio is formed by multiplication from the transmission ratios of the two epicyclic transmission 17 and 46.

In second gear, the epicyclic transmission 24 of the main axis 7—7 is shifted into its higher transmission ratio by means of a gear brake 35, with the result that torque is transmitted only via the first intermediate transmission 12 to the epicyclic transmission 17 shifted into its higher ratio by means of the gear brake 44. The two epicyclic transmission 17 and 24 thus participate in the gear ratio by multiplication.

In third gear, the coupling transmission 80 of the main axis 7—7 and the epicyclic transmission 46 of the main axis 8—8 each rotate as a single unit, with the result that only the epicyclic transmission 17 participates in the gear ratio.

In fourth gear, the epicyclic transmission 17 is additionally blocked and the gear ratio 1:1 is thus obtained.

In fifth gear, the coupling shaft 34 and consequently the second input wheel 50 are driven at a higher speed by means of the pick-off member 32 connected to the input shaft 19. In contrast to this, the first input wheel 11 rotates at a lower speed because of the effective higher transmission ratio of the epicyclic transmission 24. In the epicyclic transmission 17, the low transmission ratio of the epicyclic transmission 28 is increased again, but is still kept below 1, because the pick-off member 16 is connected to the slower output wheel 18, with the result that the inner central wheel 41 functioning as a reaction member is driven by the outer central wheel 20, via the closed drive connection 52, in an opposite direction to the outer central wheel 43 functioning as a drive member.

In reverse gear, the coupling transmission 80 of the main axis 7—7 does not participate in the gear ratio, and the torque transmission is guided via the second intermediate transmission 49 to the inner central wheel 39 of the epicyclic transmission 46 which functions as a reversing transmission because of the braked first intermediate transmission 12. The inner central wheel 41 is therefore driven by the outer central wheel 20 in an opposite direction to the input shaft 19, so that the negative transmission ratio of the reversing transmission 46 and the higher transmission ratio of the epicyclic transmission 17, selected because its outer central wheel 43 is braked, participate in the gear ratio by multiplication.

The invention is suitable for cases of installation in which a specific axle offset is to be overcome in the course of the power transmission from the engine to the wheels. When the two part transmissions are connected advantageously and when the total transmission ratio is allocated in a suitable way, better transmission efficiencies are achieved in comparison with normal drives.

A practical example is an automobile design with a transverse engine and front-wheel drive. To ensure an economical engine drive, it is necessary for the transmission to have 5 forward gears and for the power transmission from the engine to the wheels to have as few losses as possible. However, the space available as an extension of the engine crankshaft is often not sufficient to install a five-speed transmission of standard design in the vehicle.

These requirements are satisfied by means of the invention. Two main axes are predetermined by the crankshaft and the wheel drive. Depending on the position of the engine in the vehicle, the same or opposite directions of rotation prevail for the crankshaft and the wheel drive during forward motion. If the engine is located on the left, looking at the vehicle from the front, they both rotate in the same direction, but when the engine is located on the right, they rotate in opposite directions. The transmission connected to the engine is divided up as a result of the invention, and the axle reduction which is otherwise necessary is integrated directly into the transmission. The first part transmission is located, together with the torque converter, as an extension of the crankshaft and utilizes the constructional space still available between the engine and the vehicle side member.

The second part transmission is arranged either directly on the wheel drive axle or parallel to it. Its position relative to the vehicle center is largely determined by the joint of the side-shaft for the wheel drive.

When the shafts rotate in the same direction and when the second part transmission is located directly on the wheel drive axle, power transmission can take place by means of a gear chain. When gear wheels are used instead of this, an intermediate wheel is required.

The second part transmission can also be placed on the axle of this intermediate wheel and then rotates in the opposite direction; the second spur-wheel engagement is located between it and the wheel drive.

When the crankshaft and wheels rotate in opposite directions, in principle a pair of gear wheels is used for power transmission.

Improvement in transmission efficiency is obtained with the invention as explained below:

For the purpose of engine-speed adjustment, it is necessary to have between the engine and the driving wheels, in addition to a multi-step transmission, a fixed gearing stage which is generally located between the multi-step transmission and the differential to the driving wheels. When this gearing stage is incorporated in the power transmission, which is necessary in any case, between the axially offset shafts, the second output shaft can drive the differential directly. In this way, a tooth engagement is saved over the entire drive train, and the transmission efficiency is improved correspondingly. However, in this case, the dimensions of the second part transmission must be appropriate for the torques which are higher in the intermediate stage.

When the power transmission between the two axles extends over a total of three gear wheels, it is possible to place the second part transmission on the axle of the intermediate wheel (it then rotates in the opposite direction) and locate the fixed gearing stage behind the second part transmission in the second tooth engagement which is necessary in any case because of the renewed reversal of the direction of rotation. As a result, the second part transmission does not have any excessively high torques to transmit, and the total number of tooth engagements, which result in losses, has not increased.

In the double-group transmission of FIG. 3, each transmission group has 3 forward gears, and also a reverse gear can be selected in the first group. Constant step-up is effected in the intermediate transmission. The second transmission group drives the differential directly.

This is additionally loaded as a result of the increase in torque in the intermediate stage. To keep the supporting moments resulting from this within realistic limits, the second group is appropriately designed as an overdrive transmission.

The entire transmission requires 4 clutches and 3 brakes which are designed as multi-disc brakes or band brakes depending on their function. Three free wheels serve to make the gear-shifting quality as high as possible.

In the double-group transmission of FIG. 1, each transmission group has 3 forward gears, and also a reverse gear can be selected in the first group. The second transmission group is arranged parallel to the first and can be driven in the opposite direction of rotation in a ratio of approximately 1:1 via a pair of spur wheels.

The fixed gearing stage is located behind the second group in a further pair of spur wheels 62, 64 to the differential. The dimensions of this second group can consequently be made smaller. The lower supporting moments also make it possible to design the second group as a direct-gear transmission, so that in top gear no losses as a result of tooth engagements occur in either of the two transmission groups.

The entire transmission requires 3 clutches and 4 brakes; 2 free-wheels serve to ensure that the gear shifting quality is as high as possible.

The coupling transmission of FIG. 5 has 2 connections shown here as 2 gear-wheel transmissions with intermediate wheels. The second part transmission rests on the wheel drive axle and is arranged offset relative to the first part transmission. The output stage to the differential is formed by a simple planetary train. Since in this solution the gearing range of approximately 1.65-2.5 cannot be represented, the multi-step transmission is appropriately designed with overdrive as top gear, and the ratio of the output stage is made correspondingly larger. This also has the advantage that the lower gears of the coupling transmission make do with a lower ratio, that is to say smaller supporting members.

The entire transmission requires 3 clutches and 3 brakes. Two free-wheels serve for ensuring that the gear-shifting quality is as high as possible.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A five-speed drive unit for motor vehicles comprising:
    first and second planetary gear transmissions disposed on an input shaft axis of rotation aligned with a main shaft of said drive unit,
    third and fourth planetary gear transmissions disposed on an output shaft axis of rotation aligned with a differential gear system, and
    a first clutch means,
    wherein said third and fourth planetary gear transmissions are detachably coupled by said first clutch means for accommodating shifting into fifth gear.

2. The drive unit of claim 1, wherein said third gear transmission includes a first inner central wheel and said fourth planetary gear transmission includes a second inner central wheel, said first and second inner central wheels being connectable to each other by said first clutch means.

3. The drive unit of claim 2, further including a second clutch means, and an intermediate transmission having an output wheel aligned with said output shaft axis of rotation, wherein said third gear transmission further includes a pick-off member connectable to said output wheel of said intermediate transmission by said second clutch means.

4. A five-speed drive unit for motor vehicles comprising:
    a first and second planetary gear transmissions disposed on an input shaft axis of rotation aligned with a main shaft of said drive unit,
    a third and fourth planetary gear transmissions disposed on an output shaft axis of rotation aligned with a differential gear system, and
    a transmission interconnecting means for accommodating selective engagement of said planetary gear transmissions for shifting between five forward gears,
    wherein said transmission interconnecting means includes a fifth and sixth intermediate gear transmissions, each intermediate transmission including an inner wheel disposed on said input shaft axis of rotation and an outer wheel disposed on said output shaft axis of rotation.

5. The drive unit of claim 3, wherein said first planetary gear transmission includes a third inner central wheel and said second planetary gear transmission includes a fourth inner central wheel, said third and fourth inner central wheels being coupled together by a coupling shaft.

6. The drive unit of claim 5, further comprising an input shaft and a third clutch means, wherein said fourth inner central wheel is connectable to said input shaft by means of said third clutch means.

7. The drive unit of claim 6, further comprising a fourth clutch means, wherein said first planetary gear transmission further includes a first outer central wheel, said outer central wheel being connectable to said input shaft by means of said fourth clutch means.

8. The drive unit of claim 7, wherein said intermediate transmission further includes an input wheel, and said second planetary gear transmission includes a second outer central wheel, said second outer central wheel being drivingly connectable with said input wheel of said intermediate transmission, and wherein said fourth planetary gear transmission further includes a third outer central wheel, said output wheel of said intermediate transmission being connectable with said third outer central wheel.

9. The drive unit of claim 8, wherein said first and second planetary gear transmissions are coaxial with said input wheel, and said input shaft is drivingly connectable to said main shaft.

10. A drive unit of claim 4, wherein said first planetary gear transmission includes a first inner central wheel and a first outer central wheel, and said second planetary gear transmission includes a second inner central wheel and a second outer central wheel, wherein said first outer central wheel is coupled to said second inner central wheel by a first coupling shaft and said first inner center wheel is coupled to said second outer central wheel by a second coupling shaft.

11. A drive unit of claim 10, further comprising a third coupling shaft for coupling said third and fourth planetary gear transmissions and a gear brake for braking said third coupling shaft, wherein said input wheel of said fifth intermediate transmission is coupled to said gear brake and said output wheel of said fifth intermediate transmission is coupled to said third coupling shaft.

12. A drive unit of claim 11, further comprising a first pick-off member connected to said first planetary gear transmission and to said input wheel of said fifth intermediate transmission, a second pick-off member connected to said second transmission, a first driving clutch means for the drive of said second inner central wheel by said output wheel of said sixth intermediate transmission, said first clutch means being arranged between said input shaft and said input wheel of said sixth intermediate transmission, and a second driving clutch means connected to said second pick-off member, said second clutch means being arranged between said second pick-off member and an input shaft.

13. A drive unit of claim 12, wherein said gear brake, said first driving clutch means, said input wheel of said fifth intermediate transmission and said first planetary gear transmission are arranged with said input shaft axis of rotation.

14. A drive unit for motor vehicles, wherein the axes of rotation of a main shaft of an engine and an input wheel of an intermediate transmission are arranged in line with one another in relation to one of two parallel geometrical main axes;
wherein the axes of rotation of an output shaft of an epicyclic gear-change transmission connectable to a differential, and include a first epicyclic transmission of a first pick-off member connected fixedly in terms of rotation to the output shaft and belonging to said first epicyclic transmission and of the output wheel of the intermediate transmission are arranged in line with one another in relation to the other main axis;
wherein an input shaft of further gear-change transmission is drivingly connectable to the main shaft;
wherein the axis of rotation of said input shaft and of a first outer central wheel connectable to said input shaft by means of a drive clutch and belonging to a second epicyclic transmission, which second epicyclic transmission has a second pick-off member which can be brought into drive-connection with said input wheel, are arranged in line with one another relative to said main axis of said main shaft;
wherein a first inner central wheel of said second epicyclic transmission is connected to a second inner central wheel of a third epicyclic transmission which has a second outer central wheel which can be brought into drive-connection with said input wheel, and said second inner central wheel connectable to said input shaft by means of a second drive clutch;
wherein said second and third epicyclic transmissions are connected to one another by two coupling shafts, one of which is connected to said first inner central wheel and said second inner central wheel, and the other is connected to said input wheel;
wherein said second coupling shaft connected to said input wheel is connected to said second pick off member of said second epicyclic transmission, wherein a gear brake is provided for separately brakiang a third pick off member of said third epicyclic transmission,
wherein said output wheel is drivingly connectable with a third outer central wheel of said first epicyclic transmission which has said third outer central wheel connected fixedly in terms of rotation to said output shaft,
wherein said second and third epicyclic transmissions are coaxial with said input wheel,
wherein a gear brake is provided for braking the coupling shaft not connected to the input wheel,
wherein the coupling shaft not connected to the input wheel is connected to the second drive clutch; and
wherein the first epicyclic transmission is coaxial with the output wheel of the intermediate transmission, said third outer central wheel of said first epicyclic transmission and a fourth pick-off member are connected at least indirectly by means of a gear clutch, a third inner central wheel is connected to a gear brake and also meshes, together with a fourth outer central wheel used as a transmission member fixed in terms of rotation to the output shaft, with the same planet wheel, and a central wheel can be brought into drive-connection with the output wheel, wherein the fourth outer central wheel connected fixedly in terms of rotation to the output shaft is connected to said first pick-off member of said first epicyclic transmission which is coaxial with the output wheel and by which said third outer central wheel is connected fixedly in terms of rotation to the output wheel and a fourth inner central wheel is connected fixedly in terms of rotation, at least in one gear, to the inner central wheel which, together with the fourth outer central wheel fixed in terms of rotation to the output shaft, meshes with the same planet wheel, and wherein the pick-off member can be coupled dirrectly to a central wheel by means of the gear clutch.

15. A drive unit according to claim 14, wherein the fourth pick-off member connected to the gear clutch is connected separately to a gear brake.

16. A drive unit according to claim 15, wherein the gear clutch connected on the one hand to the fourth pick-off member is connected on the other hand to the inner central wheels.

17. A drive unit according to claim 14, wherein the gear clutch connected on the one hand to the fourth pick-off member is connected on the other hand to the third outer central wheel fixed in terms of rotation to the output wheel, and said fourth and third inner central wheels are connected to one another by means of a shiftable isolating clutch.

18. A drive unit for motor vehicles,
wherein the axes of rotation of a main shaft of an engine and of a first input wheel of a first intermediate transmission are arranged in line with one another in relation to one of two parallel geometrical main axes;
wherein the axes of rotation of an output shaft (14), of a first epicyclic gear change transmission connectable to a differential, of a first pick-off member connected fixedly in terms of rotation to the output shaft and belonging to a first epicyclic transmission and a first output wheel of said first intermediate transmission are arranged in line with one another in relation to the other main axis;

wherein an input shaft of a second gear-change transmission is drivingly connectable to the main shaft;

wherein the axes of rotation of said input shaft of a first drive clutch and of a first outer central wheel connectable to said input shaft by means of said first drive clutch and belonging to a second epicyclic transmission, which epicyclic transmission has a second pick-off member which can be brought into drive connection with said first input wheel, are arranged in line with one another relative to said main axis of said main shaft;

wherein a first inner central wheel of said second epicyclic transmission is connected to a second inner central wheel of a third epicyclic transmission which likewise has a second outer central wheel which can be brought into drive-connection with said input wheel and said second inner central wheel connectable to said input shaft by means of a second drive clutch;

wherein said second and third epicyclic transmissions are connected to one another by a first and a second coupling shafts, wherein said output wheel is drivingly connectable with said first pick-off member of said first epicyclic transmission which has said first pick-off member connected fixedly in terms of rotation to said output shaft;

wherein a second intermediate transmission is used with a second input wheel coaxial with the main axis of the main shaft, and with a second output wheel coaxial with the other main axis, a third inner central wheel operating as a reaction member in at least one gear of a fourth epicyclic transmission which has a third pick-off member connected fixedly in terms of rotation to the output shaft, can be brought into drive-connection with the second output wheel and said first outer central wheel, connected to the first drive clutch of said second epicyclic transmission, which has said second pick-off member connected fixedly in terms of rotation to said input wheel of said first intermediate transmission, is connected fixedly in terms of rotation to the second input wheel.

19. A drive unit according to claim 18, wherein the first input wheel is connected to said second pick-off member, the second input wheel is connected to the first coupling shaft, the second coupling shaft is connected to a gear brake and the pick-off member of the third epicyclic transmission coaxial with the input wheels is connected to the second drive clutch.

20. A drive unit according to claim 19, wherein the drive connection between the third central wheel operating as a reaction member and the second output wheel contains said first epicyclic transmission which is coaxial with the output wheel and by which said first pick-off member is connected to the first output wheel.

21. A drive unit according to claim 20, wherein the first pick-off member is connected to the first output wheel.

22. A drive unit according to claim 21, wherein the drive connection between the third central wheel operating as a reaction member and the second output wheel contains a third gear clutch.

23. A drive unit according to claim 22, wherein an overrunning clutch is connected in parallel with the third gear clutch.

24. A drive unit according to claim 23, wherein the output shaft is connected to the differential by means of a reduction unit coaxial with the main axis of the output wheels and having a third central wheel connected to a non-rotating housing part.

25. A drive unit according to claim 24, wherein the two coupling shafts are connected to one another by means of an overrunning clutch.

26. A drive unit according to claim 25, wherein the two coupling shafts are each used to connect an inner central wheel to an outer central wheel.

27. A drive unit according to claim 26, wherein the two input wheels are located between a hydrodynamic torque converter and said second epicyclic transmission, and the second input wheel adjacent to the torque converter is connected by means of a hollow shaft through which passes an input shaft, to the first coupling shaft connected to the first outer central wheel of the second epicyclic transmission.

28. A drive unit according to claim 27, wherein the first input wheel, through which passes the hollow shaft, is connected by means of a first drive drum, engaging over the first outer central wheel and connected to a first gear brake, to the second pick-off member used as a free transmission member.

29. A drive unit according to claim 16, wherein a hollow shaft, through which passes an input shaft, is used for the coupling shaft connected to the input wheel.

30. A drive unit according to claim 29, wherein the axis of rotation of the differential coincides with the main axis of the output shaft.

31. A drive unit according to claim 29, wherein the axis of rotation of the differential coincides with a third geometrical main axis parallel to the two main axes.

32. A five-speed drive unit for motor vehicles comprising:
a first pair of epicyclic transmissions disposed on an input shaft axis of rotation of a drive unit input shaft,
a second pair of epicyclic transmissions disposed on an output shaft axis of rotation of a drive unit output shaft,
a transmission interconnecting means for accommodating selective engagement of said first and second pairs of epicyclic transmissions, to effect shifting between five forward gears,
wherein said first pair of epicyclic transmissions includes a first and second transmission each having an inner central wheel and an outer central wheel, wherein said outer wheel of said first transmission is coupled to said inner wheel of said second transmission by a first coupling shaft, and said inner wheel of said first transmission is coupled to said outer wheel of said second transmission by a second coupling shaft;
wherein said second pair of epicyclic transmissions includes a first and second transmission, said second transmission having an inner central wheel;
wherein said transmission interconnecting means includes:
a third coupling shaft for coupling said first and second transmissions of said second pair, a gear brake for braking said third coupling shaft,
a first intermediate transmission having an input and an output wheel,
a second intermediate transmission having an input and an output wheel, wherein said input wheel is coupled to said gear brake and said output wheel is coupled to said third coupling shaft,
a first pick-off member connected to said first transmission of said first pair of epicyclic transmissions and to said input wheel of said second intermediate transmission,
a second pick-off member connected to said second transmission of said first pair of epicyclic transmissions,
a first driving clutch means for the drive of said inner central wheel of said second transmission of said second pair by said output wheel of said first intermediate transmission and with respect to its effect, is arranged between said input shaft and said input wheel of said first intermediate transmission, and
a second driving clutch means connected to said second pick-off member and with respect to its effect, is arranged between said second pick-off member and said input shaft.

33. A drive unit according to claim 32,
wherein said gear brake, first driving clutch means, input wheel of said second intermediate transmission, and said first transmission of said first pair of epicyclic transmissions are arranged in alignment with said input shaft axis of rotation.

34. A drive unit assembly according to claim 33,
wherein said first transmission of said second pair includes an inner central wheel and said second transmission of said second pair includes an outer central wheel;
wherein said transmission interconnecting means further includes a third clutch means for the driving connection between said output wheel of said first intermediate transmission and said inner central wheel of said first transmission of said second pair; said third clutch means is connected to said outer central wheel of said second transmission of second pair.

35. A drive unit assembly according to claim 34,
wherein said transmission interconnecting means further includes a first overriding clutch which is arranged in parallel to said third clutch means, and a second overriding clutch which is connected between said first and second coupling shafts.

36. A drive unit assembly according to claim 35,
further including a hydrodynamic torque converter which is aligned with said input shaft axis of rotation,
wherein said input wheels of said first and second intermediate transmissions are disposed between said torque converter and said first transmission of said first pair of epicyclic transmissions,
wherein said first coupling shaft is connected to said input wheel of said first intermediate transmission, whereby a hollow shaft is used that is penetrated by said input shaft of said torque converter.

37. A drive unit assembly according to claim 36,
wherein said interconnecting means further includes a drive drum which is connected to said first pick-off member, said input wheel of said second intermediate transmission, and said gear brake for braking said third coupling shaft.

* * * * *